United States Patent
Ishii

(10) Patent No.: US 6,720,071 B2
(45) Date of Patent: Apr. 13, 2004

(54) TIP SEAL AND SEAL MATERIAL FOR SCROLL TYPE COMPRESSOR

(75) Inventor: Takuya Ishii, Mie (JP)

(73) Assignee: NTN Corporation, Osaka (JP)

(*) Notice: Subject to any disclaimer, the term of this patent is extended or adjusted under 35 U.S.C. 154(b) by 40 days.

(21) Appl. No.: 10/078,987

(22) Filed: Feb. 19, 2002

(65) Prior Publication Data

US 2002/0168506 A1 Nov. 14, 2002

(30) Foreign Application Priority Data

Feb. 21, 2001 (JP) .................................. P2001-045472

(51) Int. Cl.[7] .................................................. B32B 9/00
(52) U.S. Cl. ...................... 428/367; 428/375; 428/423; 428/425.9; 428/477.4; 428/525
(58) Field of Search .......................... 428/292.4, 292.1, 428/477.4, 525, 367, 375, 423.7, 425.9, 457

(56) References Cited

FOREIGN PATENT DOCUMENTS

| JP | 53-110175 | 9/1978 |
|---|---|---|
| JP | 61-065500 | 3/1986 |
| JP | 61-174308 | 7/1986 |
| JP | 61-305063 | 12/1986 |
| JP | 61-305064 | 12/1986 |
| JP | 07-076078 | 3/1995 |
| JP | 08-078995 | 4/1996 |

*Primary Examiner*—Merrick Dixon
(74) *Attorney, Agent, or Firm*—Hedman & Costigan, P.C.

(57) ABSTRACT

Disclosed is a tip seal and a seal material for a scroll type compressor with a discharge pressure of 8 MPa or more, comprising a resin composition that is molded into a spiral shape, and that contains an aromatic polyether ketone based resin containing at least 5 to 30% by weight of a carbon fiber and 1 to 30% by weight of a tetrafluoroethylene resin.

11 Claims, 1 Drawing Sheet

TIP SEAL AND SEAL MATERIAL FOR SCROLL TYPE COMPRESSOR

BACKGROUND OF THE INVENTION

The present invention relates to a seal material for use in a scroll type compressor. More particularly, the present invention relates to a tip seal for use in a scroll type compressor using a carbon dioxide gas as a refrigerant.

A scroll type compressor comprises a fixed scroll 1 and a movable scroll 2 that are eccentrically engaged each other in a spiral-shaped lap wall 3, as shown in FIG. 1 illustrating a cross-sectional view of a compressing mechanism. The fixed scroll 1 has a panel board 1a and a spiral-shaped lap 1b that is disposed vertically on the panel board 1a. The movable scroll 2 has a panel board 2a and a spiral-shaped lap 2b that is disposed vertically on the panel board 2a. The fixed scroll 1 and the movable scroll 2 are engaged eccentrically each other to form a compression space 4. The movable scroll 2 is revolved around an axis of the fixed scroll 1, whereby the compression space 4 moves to a spiral center to compress a gas.

To assure sealing properties of the compression space 4, grooves are formed at end faces of the laps of the fixed scroll 1 and the movable scroll 2 along an extended spiral direction. Tip seals 5 are spiral-shaped seal members slidably contacted with opposing panel boards, and are included in the grooves. FIG. 2 shows a perspective view of the tip seal 5.

As shown in FIG. 2, the tip seal 5 is in a spiral shape, and has a rectangle profile. The tip seal 5 is included in the groove of the end face of the lap with a space, and floats from a bottom of the groove toward the opposing panel board by a gas pressure between the groove and the opposing panel board to seal spiral walls.

The scroll is made of, for example, an aluminum alloy to lighten the weight, other than a steel product. The sliding contact surface of the scroll is often surface-treated including hard chromium plating, kanigen plating, alumite treatment, and tuframe treatment in order to improve wear resistance.

It urges that the refrigerant should be changed from conventional flon such as R12 and substituted flon such as 134a to a carbon dioxide gas from the viewpoint of solving a recent global warming problem. When the carbon dioxide gas is used as the refrigerant, it requires a higher gas compression pressure as compared with the case that the conventional refrigerant is used. Accordingly, the tip seal must be withstood a temperature of 120° C. or more, in some cases, 150° C. or more, and a discharge pressure of 8 MPa or more, in some cases, 10 MPa or more. In the case of the conventional flon and substituted flon, it is enough for the tip seal to withstand a temperature of 120° C. to 150° C., and a discharge pressure of 2 to 3 MPa.

Mineral oils used as a refrigerating machine oil are replaced with an ester oil, a polyalkylene glycol oil (hereinafter referred to as "PAG oil"), and a carbonate oil. The tip seal is required to withstand these oils.

Conventionally known materials of the tip seal for flon and substituted flon include a tetrafluoroethylene resin (hereinafter referred to as "PTFE") and an aromatic polyether ketone based resin (hereinafter referred to as "PEK") containing a melt fluororesin, both of which are disclosed in Japanese Examined Patent Publication No. 7-030747, a PEK composition containing a copper alloy as disclosed in Japanese Examined Patent Publication No. 7-122015, a PEK composition containing a carbon fiber, PTFE, and metal powder as disclosed in Japanese Examined Patent Publication No. 7-069015, and a PEK composition containing a polyphenylether oil as disclosed in Japanese Examined Patent Publication No. 7-098897. Also, there is known a PEK composition containing a liquid crystal polyester resin as disclosed in Japanese Laid-Open Patent Publication Nos. 8-267613, and 9-20883.

In the scroll type compressor using the carbon dioxide gas as the refrigerant, the tip seal must be withstood a temperature of 120° C. or more, in some cases, 150° C. or more, and a discharge pressure of 8 MPa or more, in some cases, 10 MPa or more. The conventional seal materials have undesirably insufficient load-bearing properties, wear resistance, and non-damaging properties for a mating material. Even if the materials have sufficient load-bearing properties and wear resistance, there cannot be provided sufficient melt flowability to form the tip seal.

For example, the tip seal materials disclosed in Japanese Examined Patent Publication Nos. 7-030747 and 7-122015 have poor load-bearing properties since the loading materials have no reinforcing effects.

The tip seal material disclosed in Japanese Examined Patent Publication No. 7-069015 can have sufficient load-bearing properties, but has less melt flowability. The tip seal with a small cross-sectional area cannot be formed therewith. In the scroll type compressor, when a lubricating oil is insufficient, and cannot be provided on a sliding surface under high speed and high pressure, metal powder is seized. In particular, when the scroll member that is contacted slidably therewith is made of aluminum alloy, the aluminum alloy may be damaged significantly.

The tip seal material disclosed in Japanese Examined Patent Publication No. 7-098897 is separated and decomposed when the tip seal is formed, which leads to unstable melt flowability. There cannot be provided stable load-bearing properties and wear resistance.

The tip seal materials disclosed in Japanese Laid-Open Patent Publication Nos. 8-267613 and 9-20883 may have lowered strength because of a combination of the liquid polyester resin and the PAG oil. Such tip seal materials cannot be used for the scroll type compressor using a carbon dioxide gas as the refrigerant and having the discharge pressure of 8 MPa or more, in some cases, 10 MPa or more.

SUMMARY OF THE INVENTION

An object of the present invention is to provide a tip seal and a seal material for use in a scroll type compressor using a carbon dioxide gas as a refrigerant; the tip seal and the seal material having excellent load-bearing properties, wear resistance, non-damaging properties for a mating material, and formability.

According to the present invention, a tip seal for a scroll type compressor with a discharge pressure of 8 MPa or more, comprises a resin composition that is molded into a spiral shape, and that contains an aromatic polyether ketone based resin as a main component, and at least a carbon fiber and a tetrafluoroethylene resin. The scroll type compressor uses a carbon dioxide gas as a refrigerant.

The resin composition is a PEK composition containing at least 5 to 30% by volume of the carbon fiber and 1 to 30% by volume of the PTFE resin based on the whole resin composition.

The PEK composition further contains 1 to 20% by volume of an inorganic compound having Moh's hardness of 3 or less based on the whole resin composition.

According to the present invention, a carbon fiber is included as a fibrous reinforcing material, thereby improving load-bearing properties and wear resistance of the PEK composition. In addition, PTFE is included therein as a solid lubricating material, whereby no seizure occurs, and low frictional properties are added to the seal material if the lubricating oil is insufficient.

An addition of the inorganic compound having Moh's hardness of 3 or less reinforces fiber-to-fiber microscopically, and can improve wear resistance synergistically. When the mating material that is contacted slidably is made of aluminum alloy, the aluminum alloy may be less abraded and damaged because the inorganic compound having Moh's hardness of 3 or less is smaller than the carbon fiber, exists on the sliding surface at high density, and accommodates major shear at the sliding surface.

The load-bearing properties and the wear resistance are improved by using the above-described PEK composition. When the resin has the predetermined melt viscosity, there is provided sufficient melt flowability for forming a tip seal with a small cross-sectional area. Thus, the tip seal and the seal material of the present invention are suitable for use in the scroll type compressor made of the aluminum alloy utilizing a carbon dioxide gas as the refrigerant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
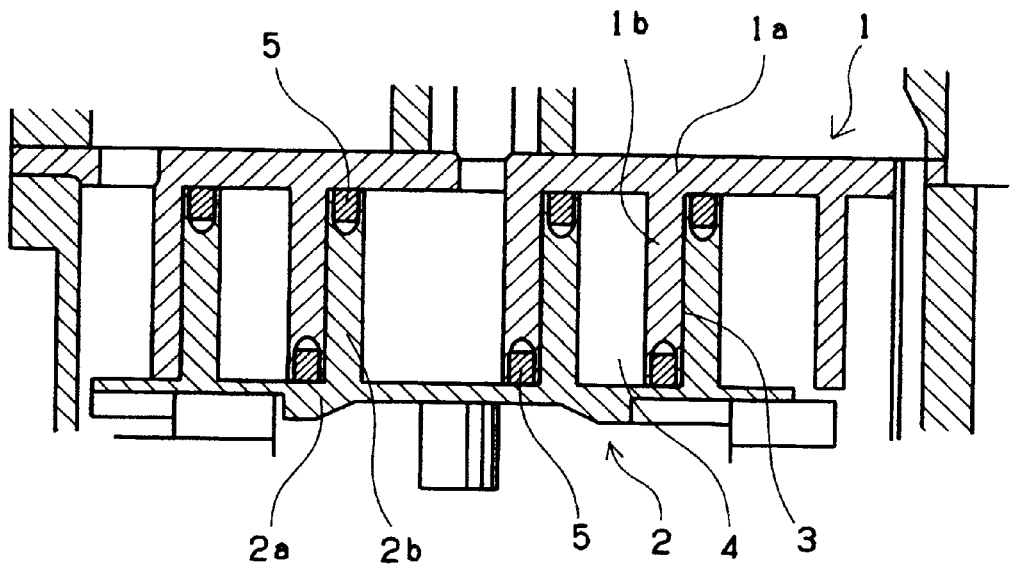
FIG. 1 is a sectional view of a compressing mechanism in a scroll type compressor.
Figure 2:
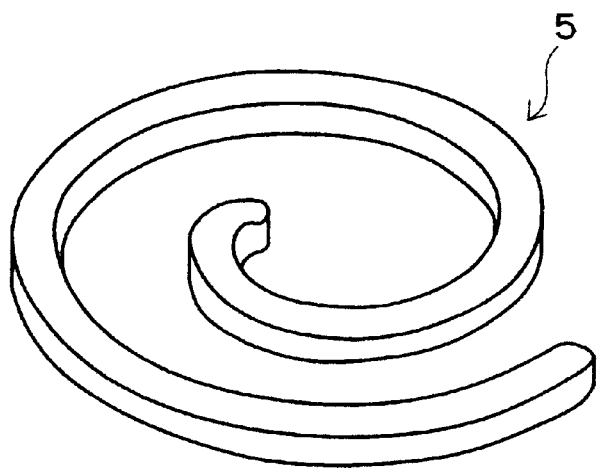
FIG. 2 is a perspective view of a tip seal.

The PEK for use in the present invention is a polymer obtained by polymerizing a monomer having a repeated unit represented by the following formula I, and a copolymer obtained by polymerizing the aforementioned monomer with a monomer having a repeated unit represented by the following formula II so that essential properties of the PEK are not lost.

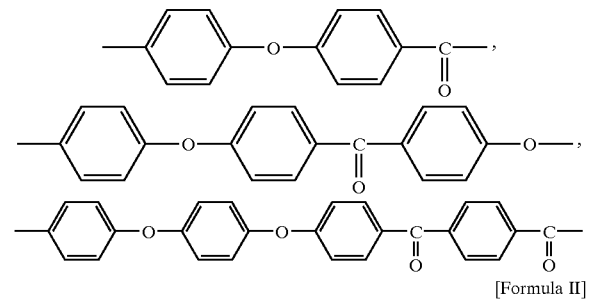

[Formula I]

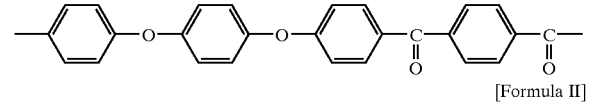

[Formula II]

Examples of commercially available PEK include a polyether ether ketone resin manufactured by Victrex Corp. comprising a repeated unit represented by the formula III, a polyether ketone resin manufactured by Victrex Corp. comprising a repeated unit represented by the formula IV, and a polyether ketone ether ketone ketone resin manufactured by BASF Ltd. under the trade name of Ultrapek comprising a repeated unit represented by the formula V. These may be produced in accordance with the well-known method as described in Japanese Laid-Open Patent Publication No. 54-90296.

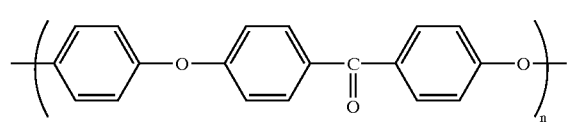

[Formula III]

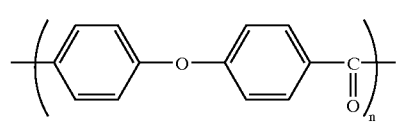

[Formula IV]

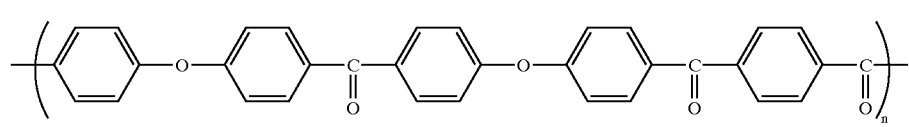

[Formula V]

The PEK has melt viscosity of 50 to 300 Pa·s, preferably 100 to 300 Pa·s at a resin composition temperature of 380° C. and a shear speed of 1000 s$^{-1}$. If the melt viscosity is less than 50 Pa·s, a molecular weight of the PEK is too small to provide the seal material with sufficient mechanical properties and wear resistance, and a production of burrs are increased after injection molding. On the other hand, if the melt viscosity exceeds 300 Pa·s, it becomes difficult to injection mold the seal material for the scroll type compressor.

Suitable commercially available PEK is a polyether ether ketone resin manufactured by Victrex Corp. under the trade name of PEEK 150P, 151G.

The carbon fiber for use in the present invention can be a pitch type or PAN type that are classified by raw materials. Preferred is a PAN based carbon fiber having high elastic modulus. A fire temperature of the carbon fiber is not especially limited, but is preferably about 1000 to 1500° C. to carbonize the fiber, than 2000° C. or more to graphitize the fiber. Within the preferable temperature range, the carbonized product less abrades and damages the aluminum alloy as the mating material that is contacted slidably therewith. The carbon fiber may be surface-treated by a processing agent containing epoxy and the like in order to improve mixing properties, dispersibility, and adhesion to the PEK.

The carbon fiber has a diameter of 20 µm or less, preferably 3 to 15 µm, more preferably 5 to 15 µm. If the carbon fiber has a diameter of more than 20 µm, load-bearing properties are poorly improved, and may undesirably abrade and damage the mating material made of the aluminum alloy that is contacted slidably therewith. On the other hand, if the carbon fiber has a diameter of less than 3 µm, reinforcing effects are decreased. The carbon fiber may be a chopped fiber or milled fiber. A fiber length of the carbon fiber is not especially limited, but preferably 0.05 mm or more to provide sufficient reinforcing effect.

Examples of commercially available pitch based carbon fiber for use in the present invention include Kureka M-101S, M-107S, M-101F, M-201S, M-207S, M-2007S, C-103S, C-106S, and C-203S manufactured by Kureha Chemical Industry Co., Ltd., and Dona Carbon S241, S244, SG341, SG241, and SG244 manufactured by Osaka Gas Chemicals, Co., Ltd.

Examples of commercially available PAN based carbon fiber for use in the present invention include Besfite HTA-CMF0160-OH, HTA-CMF0040-OH, HTA-C6, and HTA-C6-S manufactured by Toho Rayon Co., Ltd., and Toreka MLD-30, MLD-100, MLD-300, T008, and T010 manufactured by Toray Industries, Inc.

The PTFE for use in the present invention may be molding powder by suspension polymerization, fine powder by emulsion polymerization, and reproduced PTFE. It is preferable that the PTFE be not fibrillated by shearing in a mixing step upon formation, and do not increase its melt viscosity in order to stabilize flowability of the PEK composition. One of the non-fibrillated PTFE is the reproduced PTFE.

The reproduced PTFE herein means heat-treated powder (heat history applied), and powder irradiated with γ ray or electron beam. Specifically, there is powder obtained by heat-treating the molding powder or the fine powder; powder obtained by irradiating the thus-obtained powder with γ ray or electron beam; powder obtained by milling a molded product of the molding powder or the fine powder; powder obtained by irradiating the thus-obtained powder with γ ray or electron beam; and powder obtained by irradiating the molding powder or the fine powder with γ ray or electron beam. More preferably, the reproduced PTFE is irradiated with γ ray or electron beam, since the PTFE does not flocculate, is not fibrillated at a melt temperature of the PEK, has internal lubricating effect, and can stabilize and improve flowability of the PEK composition.

Examples of commercially available PTFE include KTL-610, KTL-450, KTL-350, KTL-8N, and KTL-400H manufactured by Kitamura Limited; Teflon 7J, and TLP-10 manufactured by Du Pont-Mitsui Fluorochemicals, Co., Ltd.; Fluon G163, L150J, L169J, L170J, L172J, and L173J manufactured by Asahi Glass, Co., Ltd.; Polyfulon M-15, and Lublon L-5 manufactured by Daikin Industries, Ltd.; and Hostaflon TF9205, and TF9207 manufactured by Hoechst Corp. The PTFE may be modified with a side chain group having a perfluoroalkyl ether group, a fluoroalkyl group, or other fluoroalkyl group.

Examples of the reproduced PTFE irradiated with γ ray or electron beam include KTL-610, KTL-450, KTL-350, KTL-8N, and KTL-8F manufactured by Kitamura limited; and Fluon L169J, L170J, L172J, and L173J manufactured by Asahi Glass Co., Ltd.

The inorganic compound having Moh's hardness of 3 or less has any non-limiting shape such as fibrous, tabular, and granular, and desirably has a size of 100 µm or less. The size herein means an average fiber length when the inorganic compound is fibrous, and an average diameter when the inorganic compound is tabular or granular. In order to reinforce fiber-to-fiber microscopically, the tabular compound is preferable than the fibrous compound, the granular compound is more preferable than the tabular compound, and the size is more preferably within the range of 1 to 50 µm. If the diameter is extremely small, i.e., less than 1 µm, the composition cannot have sufficient wear resistance. Examples of the inorganic compound for use in the present invention include calcium sulfate, calcium carbonate, and magnesium sulfate.

Calcium sulfate is classified into two types: anhydrate and hemihydrate. Preferred is calcium sulfate anhydrate. Magnesium sulfate is classified into two types: anhydrate and heptahydrate. Preferred is magnesium sulfate anhydrate.

Examples of commercially available inorganic compound for use in the present invention include D-101A (anhydrate type), D-200 (anhydrate type), and FT-2 (hemihydrate type) manufactured by Noritake Co., Limited as calcium sulfate having Moh's hardness of 2 to 3; NA600 manufactured by Nichitsu Kogyo Co., Ltd. as calcium carbonate having Moh's hardness of 3; and regent grade magnesium sulfate manufactured by Wako Pure Chemical Industries, Ltd. as magnesium sulfate having Moh's hardness of 2 to 3.

The PEK composition contains 5 to 30% by volume of the carbon fiber, 1 to 30% by volume of the PTFE based on the whole composition, both of which are main components, and the balance of PEK. The PEK composition further contains 1 to 20% by volume of the inorganic compound having Moh's hardness of 3 or less. If the PEK composition contains more than 30% by volume of the carbon fiber, melt flowability is significantly decreased, and the mating material made of the aluminum alloy that is contacted slidably may be abraded and damaged. On the other hand, if the PEK composition contains less than 5% by volume of the carbon fiber, the PEK composition is less reinforced, and has insufficient wear resistance. If the PEK composition contains more than 30% by volume of PTFE, the wear resistance is lower than the requirements. On the other hand, if the PEK composition contains less than 1% by volume of PTFE, the PEK composition provides less lubricity than required, and insufficient sliding properties. If the PEK composition contains more than 20% by volume of the inorganic compound, melt flowability is significantly increased, and the wear resistance is lower than the requirements. On the other hand, if the PEK composition contains less than 1% by volume of the inorganic compound, the PEK composition provides no microscopic reinforcement, has insufficient wear resistance, and may abrade and damage the aluminum alloy.

Within the above range, the total % by volume of the carbon fiber, PTFE and the inorganic compound in the PEK composition is preferably 6% by volume or more, more preferably 10% by volume or more. If the total % by volume is less than 6% by volume, it cannot be provided wear resistance, load-bearing properties, and lubricity required for the tip seal. The upper limit of the total % by volume is not especially limited provided that the PEK composition has melt viscosity of 50 to 300 Pa·s at a resin composition temperature of 380° C. and a shear speed of 1000 s$^{-1}$.

The following well-known additives can be added to the composition as long as the properties of the PEK composition is not impaired. Examples include a friction property improver such as graphite, boron nitride, molybdenum disulfide, and tungsten disulfide; a coloring agent such as carbon powder, iron oxide, and titanium oxide; a cracking property improver such as graphite; and a thermal conductivity improver such as metal oxide powder.

The above-mentioned various materials are mixed and kneaded with non-limiting means. For example, only the powder materials are dry blended using a Henschel mixer, a ball mixer, a ribbon blender, a Redige mixer, or an ultra Henschel mixer, and then melt kneaded using a melt extruder such as twin screw extruder to provide pellets (powder) to be molded. The loading materials may be introduced thereinto from a side feeder upon melt kneading with the twin screw extruder. Examples of the molding method include extrusion molding, injection molding, and hot compression molding. Especially preferred is the injection molding in view of production efficiency. The molded product may be treated, i.e., annealed, for improving physical properties.

The tip seal for the scroll type compressor of the present invention can withstood a temperature of 120° C. or more, preferably 150° C. or more, and a pressure of 8 MPa or more, preferably 10 MPa or more, whereby the tip seal is especially suitable for use in the compressor utilizing a carbon dioxide gas as the refrigerant. Also, the tip seal of the present invention can be used for the scroll compressor using conventional flon, substituted flon, and other refrigerants.

The seal material for the scroll type compressor of the present invention can be used for a swash plate type, a rotary type, a liner type, and a screw type compressors.

EXAMPLES 1 to 13 and COMPARATIVE EXAMPLES 1 to 7

Materials used in Examples and Comparative Examples are summarized below, and numbered in parenthesis used in Table 1, and their abbreviations follow.
(1) Aromatic polyether ether ketone resin [PEEK] "PEEK 150P" manufactured by Victrex Corp.
(2) PAN type carbon fiber [CF-1]
"Besfight HTA-CMF0160-OH" having a fiber length of 0.16 mm, and a fiber diameter of 7 μm manufactured by Toho Tenax Co., Ltd.
(3) PAN based carbon fiber [CF-2]
"Torayca MLD-30" having a fiber length of 0.03 mm, and a fiber diameter of 7 μm manufactured by Toray Industries, Inc.
(4) Pitch based carbon fiber [CF-3]
"Kreca M-101S" having a fiber length of 0.13 mm, and a fiber diameter of 14.5 μm manufactured by Kureha Chemical Industry Co., Ltd.
(5) Pitch based carbon fiber [CF-4]
"Kreca M-101T" having a fiber length of 0.13 mm, and a fiber diameter of 18 μm manufactured by Kureha Chemical Industry Co., Ltd.
(6) Pitch based carbon fiber [CF-5]
"Kreca M-107S" having a fiber length of 0.7 mm, and a fiber diameter of 14.5 μm manufactured by Kureha Chemical Industry Co., Ltd.
(7) Pitch based carbon fiber [CF-6]
"Kreca M-207S" having a fiber length of 0.7 mm, and a fiber diameter of 14.5 μm manufactured by Kureha Chemical Industry Co., Ltd.
(8) Calcium carbonate powder [$CaCO_3$]
"NA600" having Moh's hardness of 3 and an average diameter of 3 μm manufactured by Nichitsu Kogyo Co., Ltd.
(9) Calcium sulfate powder [$CaSO_4$]
"D-101A" which is an anhydrate type having Moh's hardness of 2 to 3 and an average diameter of 25 μm manufactured by Noritake Co., Limited.
(10) PTFE [PTFE-1]
"KTL-610", which is reproduced PTFE, heat-treated, milled, and γ ray irradiated, manufactured by Kitamura Limited.
(11) PTFE [PTFE-2]
"KT-400H", which is reproduced PTFE, and heat-treated, milled, manufactured by Kitamura Limited.
(12) PTFE [PTFE-3]
"Teflon 7J", which is molding powder, manufactured by Du Pont-Mitsui Fluorochemicals, Co., Ltd.
(13) Melt fluororesin [PFA]
"Teflon MP-10" manufactured by Du Pont-Mitsui Fluorochemicals, Co., Ltd.
(14) Bronze powder [BP]
"AT-350" manufactured by Fukuda Metal Foil & Powder Co., Ltd.

In each Examples and Comparative Examples, materials were put in a Henschel dry mixer in the amounts (% by volume) shown in Table 1, and dry blended together. The mixtures thus obtained were then fed into a twin-screw extruder to melt knead the mixtures into pellets. The pellets thus formed were injection-molded at a resin temperature of 380° C. and a die temperature of 180° C. to form molded products. The thus-obtained molded products were cut to provide ring-shaped test pieces for friction and wear tests having an inside diameter of 46 mm, an outside diameter of 50 mm, and a width of 11 mm. Equally spaced four grooves having a width of 2 mm and a thickness of 2 mm were disposed at an angle of 45 degree on respective sliding surfaces of the test pieces.

The test pieces were subjected to a limit surface pressure test and a wear test, and the pellets were measured for melt viscosities to evaluate various properties as the seal materials for the scroll type compressor.

1. Limit Surface Pressure

Each test piece was set on a ring-on-disk tester, and measured for limit surface pressures against S45C (carbon steel for machine structural use) and ADC12 (aluminum alloy: JIS H2118 type 12) under the test conditions shown in Table 2. A surface pressure was increased 1 MPa per hour. The limit surface pressure was recorded when the surface of the test piece was abraded in a depth of 0.02 mm or more, or was melted. The results are shown in Table 1.

2. Wear Test

Each test piece was set on a ring-on-disk tester, and measured for wear under the test conditions shown in Table 2. A wear loss after 20 hours and a friction coefficient were determined. The results are shown in Table 1.

3. Melt Viscosity

Each melt viscosity of the pellets in Examples and Comparative Examples was measured with Capillagraph manufactured by Toyo Seiki Seisakusho KK using a capillary having a size of 1 mm (inner diameter)×10 mm (length) at a resin temperature of 380° C. and at a shear speed of 1000 s$^{-1}$. The results are shown in Table 1.

4. Carbon Dioxide Gas Aging Test

The pellets made of each resin composition in Examples were injection molded at a resin temperature of 380° C. and a die temperature of 180° C. to provide a bending test piece having a width of 12.7 mm, a length of 128 mm, and a thickness of 3.2 mm. Thus-obtained bending test piece was aged with a carbon dioxide gas under the test conditions shown in Table 3. Bending strengths of "not-aged" and "aged" bending test pieces were measured at room temperature in accordance with ASTM D790. A rate of change before and after aging is shown in Table 4.

TABLE 1

| | Example |||||||||||||
|---|---|---|---|---|---|---|---|---|---|---|---|---|---|
| | 1 | 2 | 3 | 4 | 5 | 6 | 7 | 8 | 9 | 10 | 11 | 12 | 13 |
| Material | | | | | | | | | | | | | |
| (1)PEK | 80 | 70 | 85 | 70 | 80 | 80 | 80 | 80 | 80 | 70 | 70 | 80 | 87 |
| (2)CF-1 | 10 | 20 | 5 | 10 | — | — | — | — | — | 10 | 10 | — | — |
| (3)CF-2 | — | — | — | — | 10 | — | — | — | — | — | — | — | — |
| (4)CF-3 | — | — | — | — | — | 10 | — | — | — | — | — | 10 | 10 |
| (5)CF-4 | — | — | — | — | — | — | 10 | — | — | — | — | — | — |
| (6)CF-5 | — | — | — | — | — | — | — | 10 | — | — | — | — | — |
| (7)CF-6 | — | — | — | — | — | — | — | — | 10 | — | — | — | — |
| (8)CaCO$_3$ | — | — | — | — | — | — | — | — | — | 10 | — | — | — |
| (9)CaSO$_4$ | — | — | — | — | — | — | — | — | — | — | 10 | — | — |
| (10)PTFE-1 | 10 | 10 | 10 | 20 | 10 | 10 | 10 | 10 | 10 | 10 | 10 | — | — |
| (11)PTFE-2 | — | — | — | — | — | — | — | — | — | — | — | 5 | — |
| (12)PTFE-3 | — | — | — | — | — | — | — | — | — | — | — | — | 3 |
| (13)PFA | — | — | — | — | — | — | — | — | — | — | — | — | — |
| (14)BP | — | — | — | — | — | — | — | — | — | — | — | — | — |
| Properties | | | | | | | | | | | | | |
| Limit surface test | | | | | | | | | | | | | |
| against S45C (MPa) | 15 | 16 | 12 | 15 | 11 | 14 | 14 | 15 | 14 | 13 | 14 | 14 | 12 |
| against ADC12 (MPa) | 15 | 14 | 11 | 16 | 11 | 13 | 11 | 11 | 10 | 16 | 16 | 13 | 11 |
| Wear test | | | | | | | | | | | | | |
| Wear loss (μm) | 14 | 10 | 30 | 8 | 40 | 25 | 30 | 28 | 35 | 29 | 25 | 35 | 40 |
| Friction coefficient | 0.07 | 0.08 | 0.09 | 0.06 | 0.10 | 0.07 | 0.08 | 0.08 | 0.09 | 0.08 | 0.08 | 0.10 | 0.11 |
| Melt viscosity (Pa · s) | 180 | 250 | 140 | 160 | 170 | 190 | 180 | 190 | 200 | 280 | 250 | 290 | 300 |

| | Comparative Example ||||||| 
|---|---|---|---|---|---|---|---|
| | 1 | 2 | 3 | 4 | 5 | 6 | 7 |
| Material | | | | | | | |
| (1)PEK | 70 | 90 | 75 | 70 | 80 | 90 | 70 |
| (2)CF-1 | 30 | 10 | — | 10 | — | — | — |
| (3)CF-2 | — | — | — | — | — | — | — |
| (4)CF-3 | — | — | — | — | — | — | — |
| (5)CF-4 | — | — | — | — | — | — | — |
| (6)CF-5 | — | — | — | — | — | — | — |
| (7)CF-6 | — | — | 10 | — | — | — | — |
| (8)CaCO$_3$ | — | — | — | — | — | — | — |
| (9)CaSO$_4$ | — | — | — | — | — | — | — |
| (10)PTFE-1 | — | — | 10 | 10 | 10 | — | 20 |
| (11)PTFE-2 | — | — | — | — | — | — | — |
| (12)PTFE-3 | — | — | — | — | — | — | — |
| (13)PFA | — | — | — | — | — | — | 10 |
| (14)BP | — | — | 5 | 10 | 10 | 10 | — |
| Properties | | | | | | | |
| Limit surface test | | | | | | | |
| against S45C (MPa) | 7 | 9 | 11 | 10 | 5 | 2 | 1 |
| against ADC12 (MPa) | 3 | 5 | 4 | 3 | 2 | 1 | 2 |
| Wear test | | | | | | | |
| Wear loss (μm) | 50 | 70 | 50 | 60 | 130 | 155 | 210 |
| Friction coefficient | 0.13 | 0.12 | 0.11 | 0.1 | 0.11 | 0.13 | 0.09 |
| Melt viscosity (Pa · s) | 400 | 210 | 320 | 350 | 250 | 270 | 250 |

TABLE 2

Test conditions 1

| | Limit surface pressure test | Wear test |
|---|---|---|
| Sliding velocity | 300 m/min | 150 m/min |
| Surface pressure | increases 1 MPa per hour | 10 MPa |
| Lubricating oil | Idemitsu Dafny hermetic oil PS (circulating type) | Idemitsu Dafny hermetic oil PS (circulating type) |
| Oil temperature | 100° C. | 100° C. |
| Mating material | S45C, ADC12 | S45C |
| Time | — | 20 hours |

TABLE 3

Test conditions 2

| | Carbon dioxide gas aging test |
|---|---|
| Atmosphere | Carbon dioxide gas: PAG oil = 5:1 |
| PAG oil | Idemitsu Dafny hermetic oil PS |
| Pressure | 15 Mpa |
| Temperature | 150° C. |
| Time | 500 hours |

TABLE 4

| Example No. | 1 | 2 | 3 | 4 | 5 | 6 | 7 | 8 | 9 | 10 | 11 | 12 | 13 |
|---|---|---|---|---|---|---|---|---|---|---|---|---|---|
| Rate of change in bending strength (%) | 2 | 1 | 2 | 0 | 1 | 0 | 1 | 1 | 0 | 0 | 1 | -1 | -1 |

The results shown in Table 1 reveals that in Comparative Examples 1 and 2 where PEK contained only carbon fiber, the friction coefficient is high to cause seizure, resulting in poor load-bearing and wear resistance. In Comparative Examples 3 and 4 where PEK contained carbon fiber, PTFE and bronze powder, the aluminum alloy was damaged, and low load-bearing is obtained against the aluminum alloy, although 10 MPa or more load-bearing is obtained against S45C. In addition, the melt viscosity of each resin composition of Comparative Examples 3 and 4 at temperature of 380° C. and a shear speed of 1000 s$^{-1}$ exceeds 300 Pa·s. It cannot provide sufficient melt flowability for forming the tip seal.

In sharp contrast, in Examples 1 to 13 where the predetermined materials were blended at the predetermined amount, 10 MPa or more load-bearing is obtained against both S45C steel and the aluminum alloy at high temperature oil atmosphere exceeding 100° C., both of which were scarcely damaged, and excellent low friction properties and wear resistance are provided. In addition, the melt viscosity of each resin composition of Examples 1 to 13 at temperature of 380° C. and a shear speed of 1000 s$^{-1}$ is 300 Pa·s or less.

The resin compositions show no decrease in bending strength after aging at 15 MPa and 150° C., resist a high pressure and high temperature carbon dioxide gas or lubricating oil, and can be used under such atmosphere.

The seal material for the scroll type compressor according to the present invention has load-bearing of 10 MPa or more, excellent wear resistance and sealing properties, and does not abrade nor damage the aluminum alloy slidably contacted therewith even if the lubricating oil is insufficiently provided. It concludes that the seal material is especially suitable for the tip seal for the scroll type compressor using a carbon dioxide gas as a refrigerant.

What is claimed is:

1. A spiral shaped tip seal for a scroll type compressor with a discharge pressure of a 8 MPa or more which uses a carbon dioxide gas as a refrigerant, said spiral shaped tip seal comprising a resin composition consisting essentially of,
   an aromatic polyester ketene based resin,
   a carbon fiber, and
   a tetrafluoroethylene resin,
   wherein the resin composition contains 5 to 30% by volume of the carbon fiber to 1 to 30% by volume of the tetrafluoroethylene resin based on the whole resin composition.

2. A tip seal as claimed in claim 1, wherein the aromatic polyether ketone based resin is an aromatic polymer ketone resin.

3. A tip seal as claimed in claim 1, wherein the aromatic polyether ketone based resin is an aromatic polymer ketone resin.

4. A tip seal as claimed in claim 1, wherein the aromatic polyether ketone based resin is an aromatic polyether ether ketone resin.

5. A tip seal as claimed in claim 1, wherein the tetrafluoroethylene resin is not fibrillated in a mixing step.

6. A tip seal as claimed in claim 1, wherein the resin composition has melt viscosity of 50 to 300 Pas at a resin composition temperature of 380° C. and a sheer speed of 1000 s$^{-1}$.

7. A tip seal as claimed in claim 1, wherein the carbon fiber is a PAN based carbon fiber.

8. A tip seal as claimed in claim 1, wherein the carbon fiber is a pitch based carbon fiber.

9. A tip seal as claimed in claim 1, wherein at least one scroll of the scroll type compressor is formed with an aluminum alloy, and the seal material is slidably contacted with the aluminum alloy.

10. A seal material of a resin composition for a scroll type compressor with a discharge pressure of 8 MPa or more which uses carbon dioxide gas as a refrigerant, said resin composition consisting essentially of,
    an aromatic polyether ketone based resin,
    a carbon fiber, and
    a tetrafluoroethylene resin,
    wherein the resin composition contains 5 to 30% by volume of the carbon fiber to 1 to 30% by volume of the tetrafluoroethylene resin based on the whole the resin composition.

11. A seal material of a resin composition for use in a swash plate type, a rotary type a linear type, or a screw type compressor with a discharge pressure of 8 MPa or more using a carbon dioxide gas a as a refrigerant, said resin composition consisting essentially of,
    an aromatic polyether ketone based resin,
    a carbon fiber, and
    a tetrafluoroethylene resin,
    wherein the resin composition contains 5 to 30% by volume of the carbon fiber to 1 to 30% by volume of the tetrafluoroethylene resin based on the whole resin composition.

* * * * *